(12) United States Patent
Han

(10) Patent No.: US 10,997,718 B2
(45) Date of Patent: May 4, 2021

(54) SYSTEM FOR PROVIDING AGE INFORMATION OF GINSENG CULTIVATED IN THE WOODS

(71) Applicant: HANNONGCOOP CO., LTD., Chuncheon (KR)

(72) Inventor: Eun Sub Han, Yongin (KR)

(73) Assignee: HANNONGCOOP CO., LTD., Chuncheon-si (KR)

( * ) Notice: Subject to any disclaimer, the term of this patent is extended or adjusted under 35 U.S.C. 154(b) by 0 days.

(21) Appl. No.: 16/305,347

(22) PCT Filed: Jun. 14, 2017

(86) PCT No.: PCT/KR2017/006202
§ 371 (c)(1),
(2) Date: Nov. 28, 2018

(87) PCT Pub. No.: WO2017/222234
PCT Pub. Date: Dec. 28, 2017

(65) Prior Publication Data
US 2020/0126216 A1    Apr. 23, 2020

(30) Foreign Application Priority Data

Jun. 23, 2016 (KR) .......................... 10-2016-0078823
Jun. 23, 2016 (KR) .......................... 10-2016-0078826

(51) Int. Cl.
*H04N 5/225* (2006.01)
*G06T 7/00* (2017.01)
(Continued)

(52) U.S. Cl.
CPC .......... *G06T 7/0012* (2013.01); *G06F 16/953* (2019.01); *G06K 19/06037* (2013.01); *H04N 5/23293* (2013.01)

(58) Field of Classification Search
CPC ............ G06T 7/0012; G06K 19/06037; G06F 16/953; H04N 5/23293
See application file for complete search history.

(56) References Cited

U.S. PATENT DOCUMENTS 7,499,573 B2 * 3/2009 Tanabata .................. A01G 7/00
382/110
8,600,117 B2 * 12/2013 Li ....................... G01N 33/0098
382/100

FOREIGN PATENT DOCUMENTS

JP    2001-229187    *   8/2001
JP    2001-229187 A       8/2001
(Continued)

*Primary Examiner* — Twyler L Haskins
*Assistant Examiner* — Dwight Alex C Tejano
(74) *Attorney, Agent, or Firm* — Patent Office of Dr. Chung Park

(57) ABSTRACT

A disclosed system for providing wood-cultivated ginseng age information includes a background sheet made of paper or plastic, a consumer terminal configured to obtain a wood-cultivated ginseng image of a wood-cultivated ginseng placed on the background sheet by a user, receive the start line of a wood-cultivated ginseng rhizome and the end line of the wood-cultivated ginseng rhizome by the user, calculate a wood-cultivated ginseng rhizome length using the obtained wood-cultivated ginseng image and the obtained start line and end line of the wood-cultivated ginseng rhizome, and transmit the calculated wood-cultivated ginseng rhizome length, and a server configured to previously store wood-cultivated ginseng age information corresponding to a wood-cultivated ginseng rhizome length, search for wood-cultivated ginseng age information corresponding to the wood-cultivated ginseng rhizome length received from the consumer terminal, and transmit the retrieved wood-cultivated ginseng age information to the consumer terminal.

11 Claims, 5 Drawing Sheets

(51) Int. Cl.
    *G06F 16/953*     (2019.01)
    *G06K 19/06*      (2006.01)
    *H04N 5/232*      (2006.01)

(56)  References Cited

FOREIGN PATENT DOCUMENTS

| | | |
|---|---|---|
| JP | 2002-203242 A | 7/2002 |
| JP | 2006-139703 A | 6/2006 |
| JP | 2012-057974 A | 3/2012 |
| KR | 10-2009-0066065 A | 6/2009 |
| KR | 10-2016-0049569 A | 5/2016 |

* cited by examiner

【Figure 1】
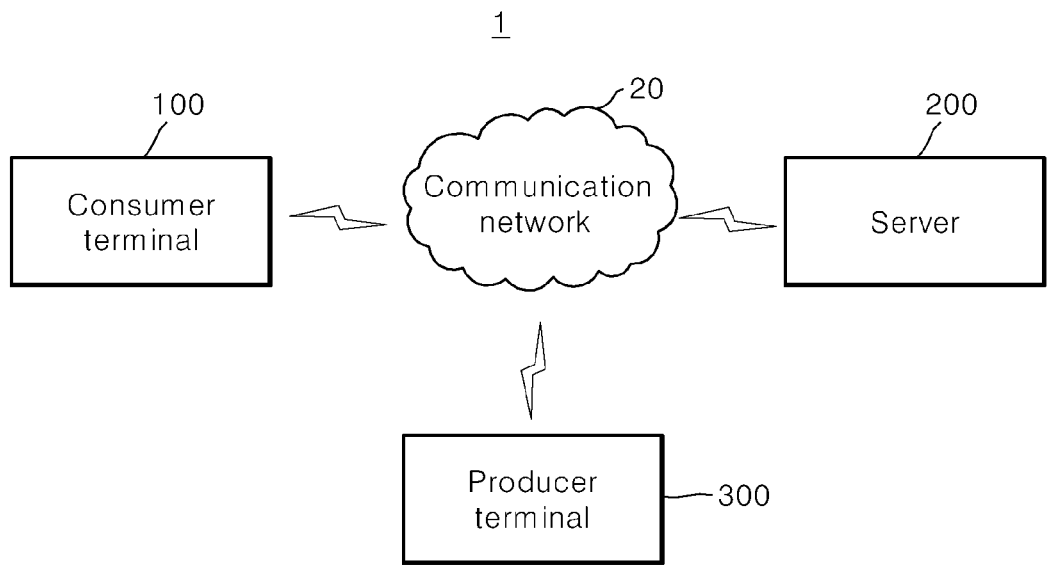
【Figure 2】
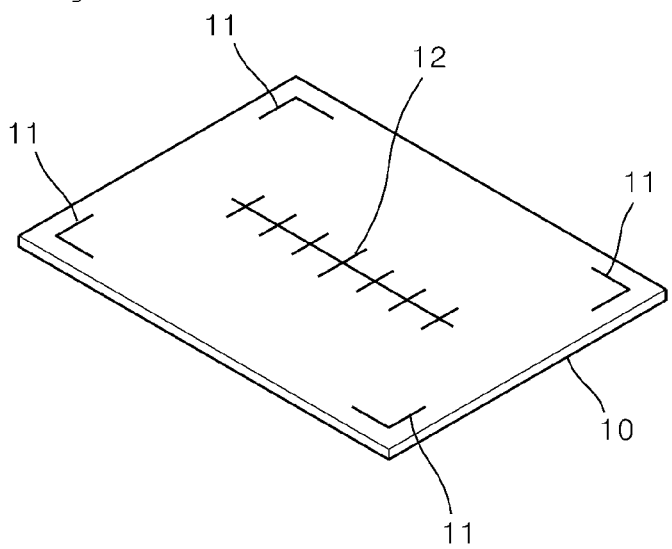

[Figure 3]
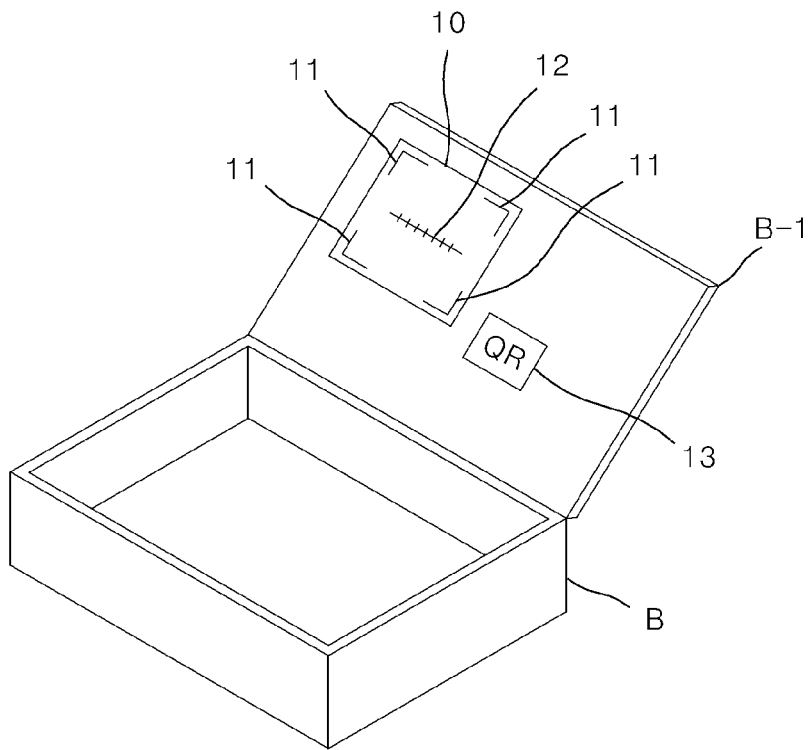
[Figure 4]
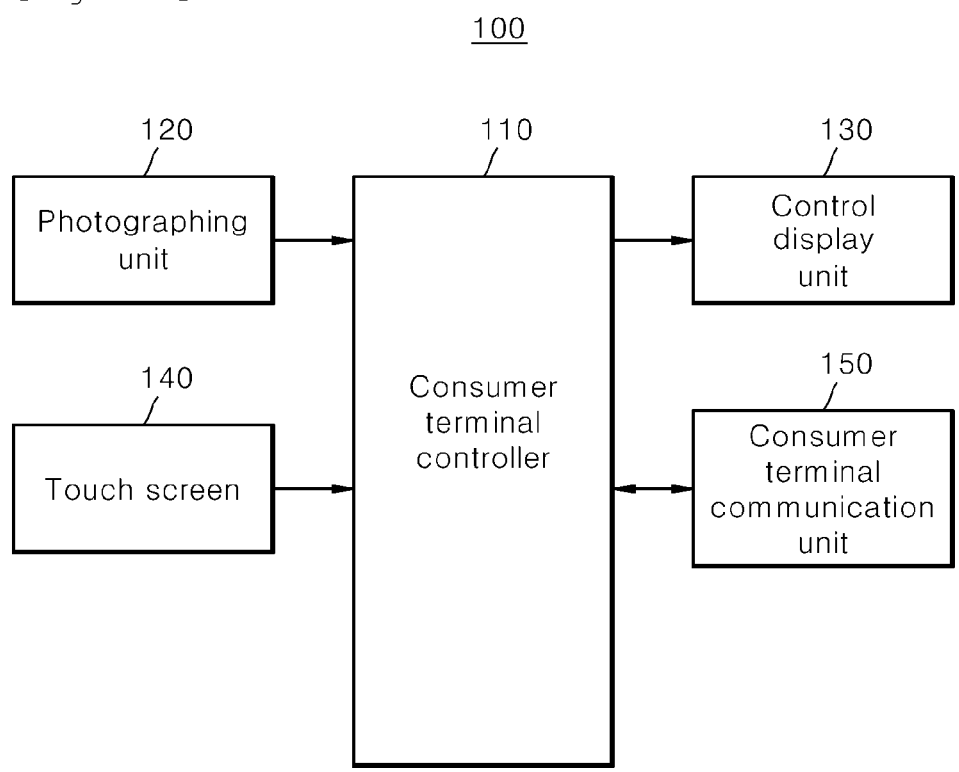

【Figure 5】
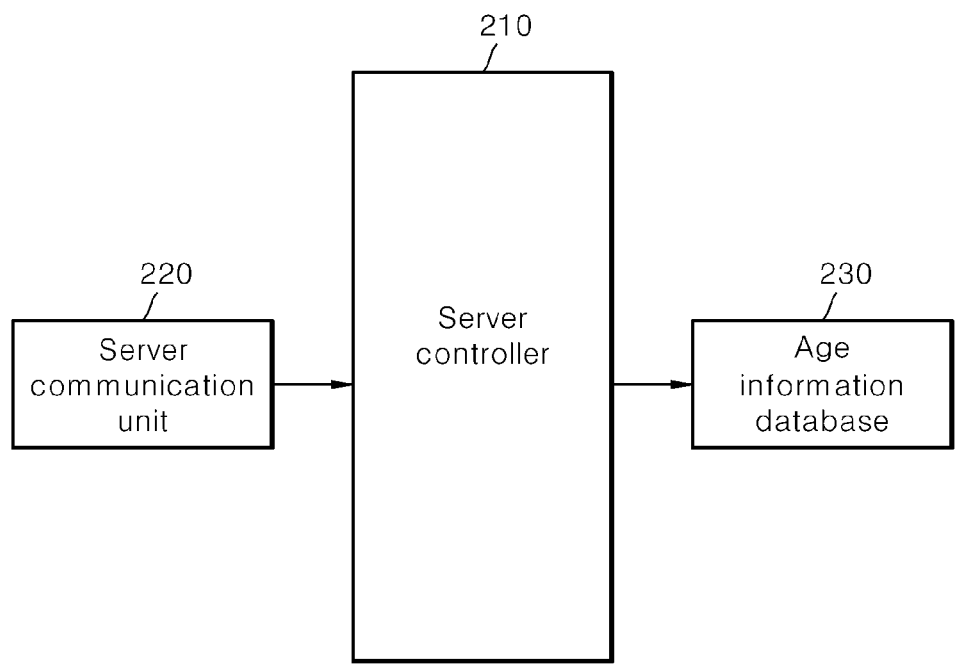
【Figure 6】
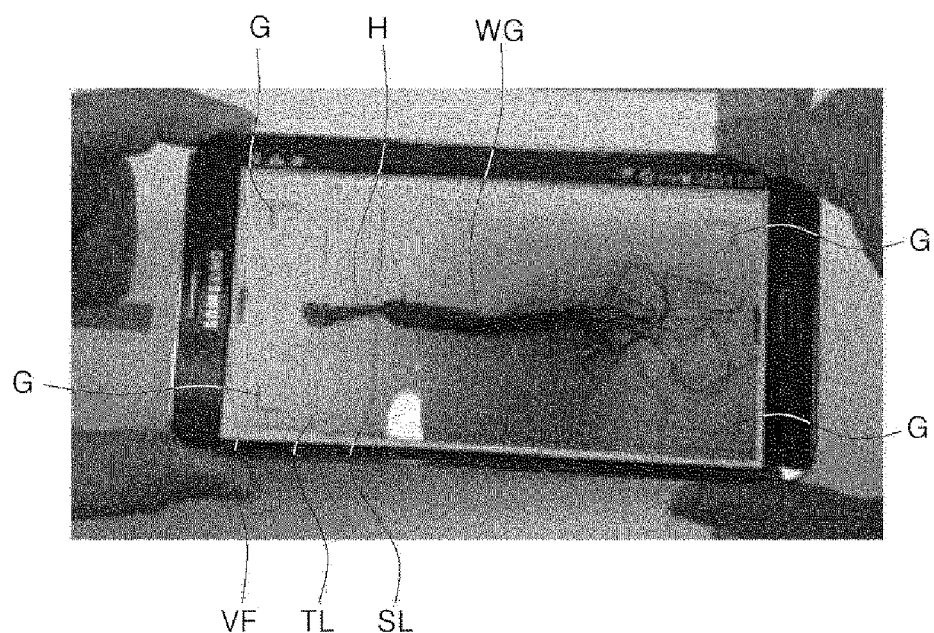

【Figure 7】
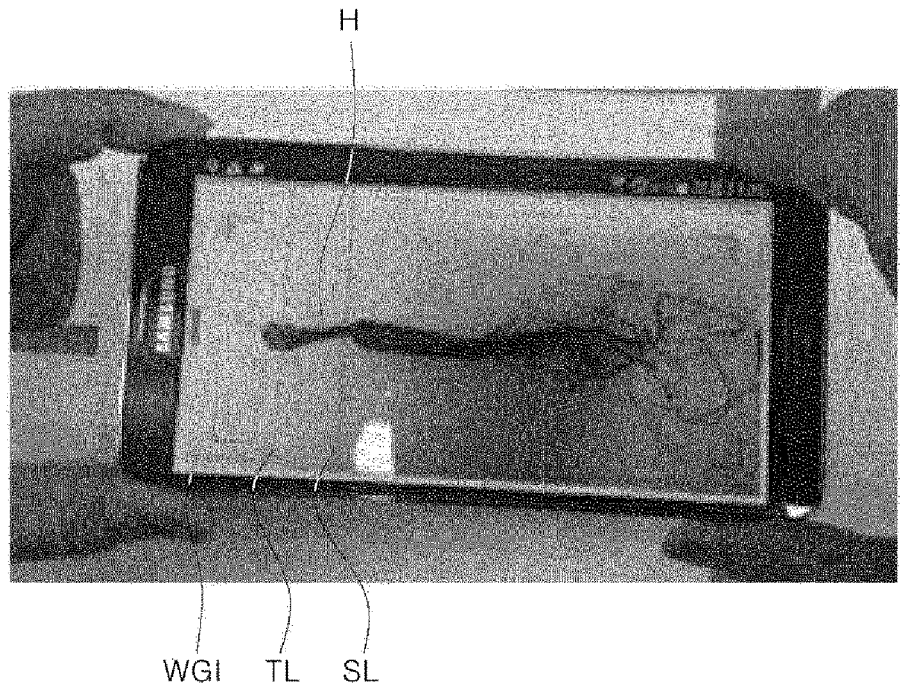
【Figure 8】
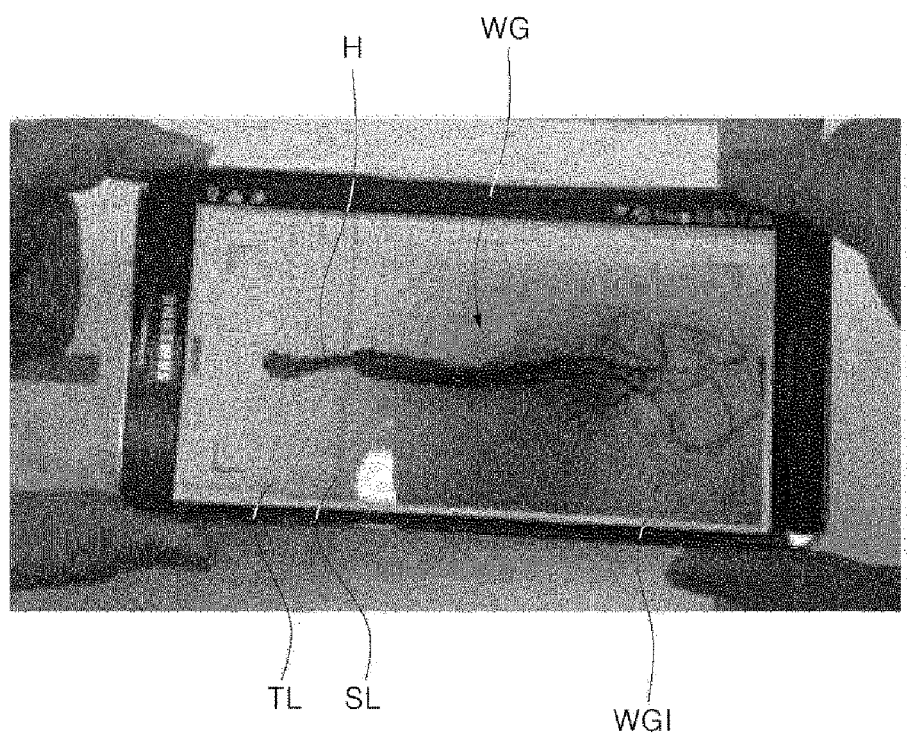

[Figure 9]
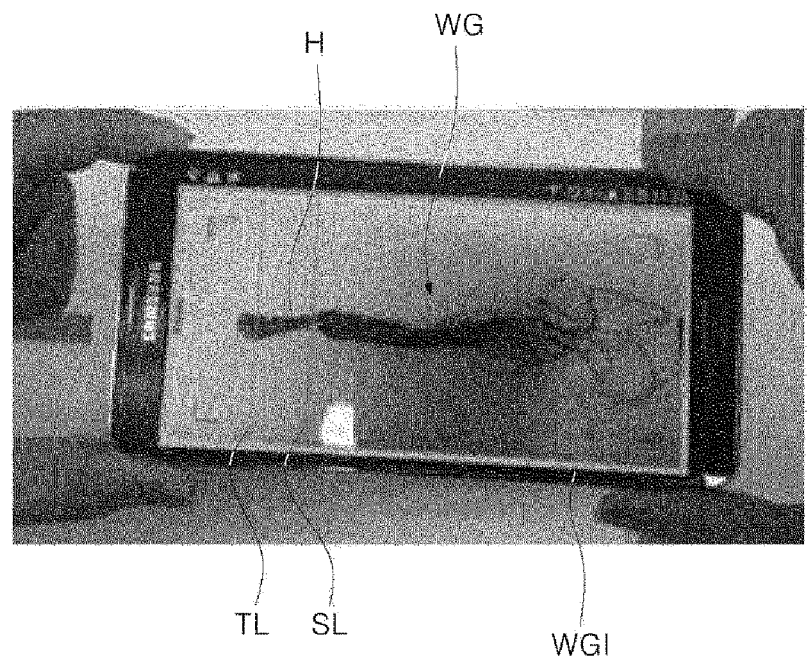
(a)
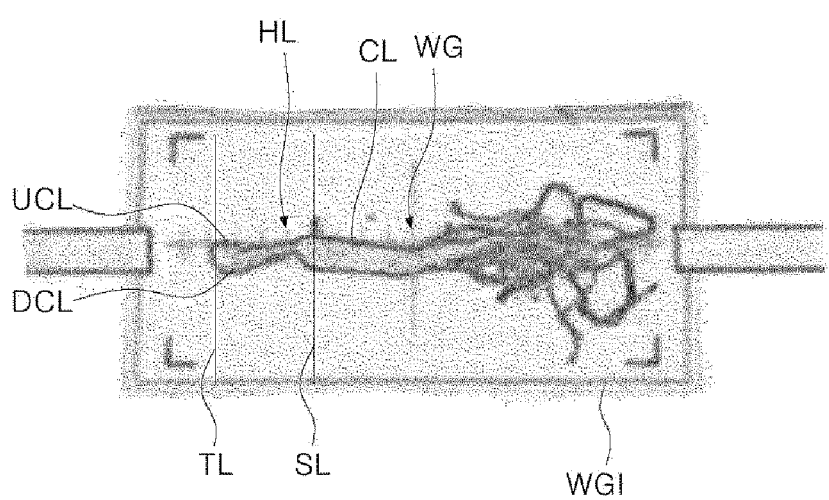
(b)

SYSTEM FOR PROVIDING AGE INFORMATION OF GINSENG CULTIVATED IN THE WOODS

CROSS-REFERENCE TO PRIOR APPLICATIONS

This application is a national Stage Patent Application of PCT International Patent Application No. PCT/KR2017/006202, filed on Jun. 14, 2017 under 35 U.S.C. § 371, which claims the benefit of Korean Patent Application No. 10-2016-0078823 filed on Jun. 23, 2016, and Korean Patent Application No. 10-2016-0078826 filed on Jun. 23, 2016, which are all hereby incorporated by reference in their entirety.

TECHNICAL FIELD

The present invention relates to a system for providing wood-cultivated ginseng age information and, more particularly, to a system for providing wood-cultivated ginseng age information, which enables a wood-cultivated ginseng consumer to be easily aware of a wood-cultivated ginseng age by providing wood-cultivated ginseng age information to the wood-cultivated ginseng consumer.

BACKGROUND ART

As the Internet is popularized from the early 2000s, e-commerce in which products are traded through stores open in the Internet is increasing. In accordance with such a trend, common agricultural products, such as rice, bean and chili, are also traded through e-commerce. Recently, wood-cultivated ginseng, that is, one of special crops, in addition to the common agricultural products is also traded through e-commerce.

Unlike a wild ginseng, a wood-cultivated ginseng is artificially sowed and cultivated and is also called a cultivated wild ginseng or Jangro. The medicinal properties of the wood-cultivated ginseng are different depending on an age called Yeongeun. As a wood-cultivated ginseng age increases, the medicinal properties thereof are increased. Accordingly, the value or price of the wood-cultivated ginseng rise according to an increase of the wood-cultivated ginseng age.

As in common e-commerce, in e-commerce for wood-cultivated ginseng, if a wood-cultivated ginseng producer posts age information different from actual wood-cultivated ginseng age information on the Internet, it may work damage to a wood-cultivated ginseng consumer. Furthermore, it may also work damage to a good wood-cultivated ginseng producer because reliability of the wood-cultivated ginseng e-commerce is reduced for a potential consumer due to the damage to a wood-cultivated ginseng consumer. Accordingly, in order to prevent damage to a wood-cultivated ginseng consumer, there is a need for a wood-cultivated ginseng consumer to identify a wood-cultivated ginseng age objectively and reliably.

In response to such a need, a ginseng age identification method disclosed in Korean Patent Application Publication No. 10-2009-0095102 may be applied to wood-cultivated ginseng.

However, the disclosed ginseng age identification method has problems in that it is difficult to apply the method to identify a wood-cultivated ginseng age and it is difficult for a wood-cultivated ginseng consumer to easily apply the method because a ginseng age is identified by dying a ginseng root histochemically and then analyzing the number of secretory vessel layers of the ginseng root.

DISCLOSURE

Technical Problem

The present invention has been made keeping in mind the above problems occurring in the prior art, and an object of the present invention is to provide a system for providing wood-cultivated ginseng age information, which enables a wood-cultivated ginseng consumer to be easily aware of a wood-cultivated ginseng age by providing wood-cultivated ginseng age information to a wood-cultivated ginseng consumer.

Furthermore, another object of the present invention is to provide a system for providing wood-cultivated ginseng age information, which enables a wood-cultivated ginseng purchase consumer to confirm whether wood-cultivated ginseng purchased and delivered through e-commerce is identical with wood-cultivated ginseng sold by a producer.

Objects of the present invention are not limited to the aforementioned objects, and other objects not described above may be evidently understood by those skilled in the art to which the present invention pertains from the following description.

Technical Solution

In an embodiment of the present invention, a system for providing wood-cultivated ginseng age information includes a background sheet made of paper or plastic; a consumer terminal configured to obtain a wood-cultivated ginseng image of a wood-cultivated ginseng placed on the background sheet by a user, receive the start line of a wood-cultivated ginseng rhizome and the end line of the wood-cultivated ginseng rhizome by the user, calculate a wood-cultivated ginseng rhizome length using the obtained wood-cultivated ginseng image and the obtained start line and end line of the wood-cultivated ginseng rhizome, and transmit the calculated wood-cultivated ginseng rhizome length; and a server configured to previously store wood-cultivated ginseng age information corresponding to a wood-cultivated ginseng rhizome length, search for wood-cultivated ginseng age information corresponding to the wood-cultivated ginseng rhizome length received from the consumer terminal, and transmit the retrieved wood-cultivated ginseng age information to the consumer terminal.

In this case, the consumer terminal may include a photographing unit configured to photograph the wood-cultivated ginseng positioned on the background sheet; a display unit configured to display a viewfinder image of the photographing unit or the wood-cultivated ginseng image; a touch screen coupled to the display unit to enable a user to input the start line and end line of the wood-cultivated ginseng rhizome; a consumer terminal communication unit configured to communicate with the server; and a consumer terminal controller configured to store the wood-cultivated ginseng image captured by the photographing unit, control the display unit to display the viewfinder image when the photographing unit captures an image, receive the start line and end line of the wood-cultivated ginseng rhizome from the touch screen in response to the user's touch when the wood-cultivated ginseng image is displayed on the display unit, calculate the wood-cultivated ginseng rhizome length, and control the consumer terminal communication unit to transmit the calculated wood-cultivated ginseng rhizome length.

In this case, reference markers may be indicated at four corner parts of the background sheet. Guidance markers corresponding to the reference markers may be indicated at four corner parts of the viewfinder image.

Furthermore, the consumer terminal controller may calculate the straight-line length of the wood-cultivated ginseng rhizome as the wood-cultivated ginseng rhizome length using the wood-cultivated ginseng image and the start line and end line of the wood-cultivated ginseng rhizome received from the touch screen.

Furthermore, the consumer terminal controller may receive the start line and end line of the wood-cultivated ginseng rhizome, may search for a red outline pattern using a pattern recognition technology, analyzes an actual length per pixel using a retrieved red outline and resolution of the photographing unit, may count pixels located in a straight line that connects the start line of the wood-cultivated ginseng rhizome and the end line of the wood-cultivated ginseng rhizome, and may calculate the straight-line length of the wood-cultivated ginseng rhizome as the wood-cultivated ginseng rhizome length by multiplying a number of the counted pixels and the actual length per pixel.

Furthermore, the consumer terminal controller may calculate a curve length of the wood-cultivated ginseng rhizome using the wood-cultivated ginseng image and the start line and end line of the wood-cultivated ginseng rhizome received from the touch screen, and may calculate the wood-cultivated ginseng rhizome based on the calculated curve length of the wood-cultivated ginseng rhizome.

Furthermore, the consumer terminal controller may receive a start line and end line of the wood-cultivated ginseng rhizome adjusted by the user, may search for a red outline pattern using a pattern recognition technology, may analyze an actual length per pixel using the retrieved red outline and resolution of the photographing unit, may extract the outlines of the wood-cultivated ginseng from the wood-cultivated ginseng image, may search the extracted outlines of the wood-cultivated ginseng for the upper outline and lower outline of the wood-cultivated ginseng between the start line of the wood-cultivated ginseng rhizome and the end line of the wood-cultivated ginseng rhizome, may eliminate image noise from the upper outline and lower outline of the wood-cultivated ginseng, and may calculate the average of the length of upper curve of the wood-cultivated ginseng rhizome and the length of lower curve of the wood-cultivated ginseng rhizome as the wood-cultivated ginseng rhizome length by multiplying the number of pixels of each of the upper curve of the wood-cultivated ginseng rhizome and the lower curve of the wood-cultivated ginseng rhizome and the actual length per pixel.

Furthermore, the server may include a wood-cultivated ginseng age information database configured to store wood-cultivated ginseng age information corresponding to a wood-cultivated ginseng rhizome length; a server communication unit configured to communicate with the consumer terminal; and a server controller configured to receive the wood-cultivated ginseng rhizome length from the consumer terminal, search the wood-cultivated ginseng age information database for age information corresponding to the wood-cultivated ginseng rhizome length received from the consumer terminal, and control the server communication unit to transmit the retrieved age information to the consumer terminal.

In this case, the wood-cultivated ginseng age information stored in the age information database and corresponding to the wood-cultivated ginseng rhizome length may be based on national statistics or local statistics. The server controller may search for wood-cultivated ginseng age information based on the local statistics when area information is received.

Furthermore, the system further includes a producer terminal configured to QR code of a wood-cultivated ginseng and a front image and rear image of the wood-cultivated ginseng. The server controller may extract the front feature element and rear feature element of the wood-cultivated ginseng from the front image and rear image of the wood-cultivated ginseng received from the producer terminal, respectively, may store the front feature element and rear feature element of the wood-cultivated ginseng in the age information database by matching the front feature element and rear feature element to the QR code received from the producer terminal, may extract the feature element of the wood-cultivated ginseng from the wood-cultivated ginseng image received from the consumer terminal when the consumer terminal transmits the QR code and the wood-cultivated ginseng image including the QR code, and may search the age information database for the front feature element and rear feature element of the wood-cultivated ginseng corresponding to the feature element of the wood-cultivated ginseng and transmits the retrieved front feature element and rear feature element to the consumer terminal.

Furthermore, in an embodiment of the present invention, a system for providing wood-cultivated ginseng age information includes a background sheet attached or printed on a wood-cultivated ginseng storage box; a consumer terminal configured to obtain a wood-cultivated ginseng image of a wood-cultivated ginseng placed on the background sheet by a user, receive the start line of a wood-cultivated ginseng rhizome and the end line of the wood-cultivated ginseng rhizome by the user, calculate a wood-cultivated ginseng rhizome length using the obtained wood-cultivated ginseng image and the obtained start line and end line of the wood-cultivated ginseng rhizome, and transmit the calculated wood-cultivated ginseng rhizome length; and a server configured to previously store wood-cultivated ginseng age information corresponding to a wood-cultivated ginseng rhizome length, search for wood-cultivated ginseng age information corresponding to the wood-cultivated ginseng rhizome length received from the consumer terminal, and transmit the retrieved wood-cultivated ginseng age information to the consumer terminal.

In this case, the wood-cultivated ginseng storage box may include a box in which the wood-cultivated ginseng has been packaged by a wood-cultivated ginseng producer. The background sheet may be attached or printed on the back of cover of the wood-cultivated ginseng storage box.

Furthermore, the consumer terminal may include a photographing unit configured to photograph the wood-cultivated ginseng positioned on the background sheet; a display unit configured to display a viewfinder image of the photographing unit or the wood-cultivated ginseng image; a touch screen coupled to the display unit to enable a user to input the start line and end line of the wood-cultivated ginseng rhizome; a consumer terminal communication unit configured to communicate with the server; and a consumer terminal controller configured to store the wood-cultivated ginseng image captured by the photographing unit, control the display unit to display the viewfinder image when the photographing unit captures an image, receive the start line and end line of the wood-cultivated ginseng rhizome from the touch screen in response to the user's touch when the wood-cultivated ginseng image is displayed on the display unit, calculate the wood-cultivated ginseng rhizome length, and control the consumer terminal communication unit to transmit the calculated wood-cultivated ginseng rhizome length.

In this case, reference markers may be indicated at four corner parts of the background sheet. Guidance markers corresponding to the reference markers may be indicated at four corner parts of the viewfinder image.

Furthermore, the consumer terminal controller may calculate the straight-line length of the wood-cultivated ginseng rhizome as the wood-cultivated ginseng rhizome length using the wood-cultivated ginseng image and the start line and end line of the wood-cultivated ginseng rhizome received from the touch screen.

Furthermore, the consumer terminal controller may receive the start line and end line of the wood-cultivated ginseng rhizome, may search for a red outline pattern using a pattern recognition technology, analyzes an actual length per pixel using a retrieved red outline and resolution of the photographing unit, may count pixels located in a straight line that connects the start line of the wood-cultivated ginseng rhizome and the end line of the wood-cultivated ginseng rhizome, and may calculate the straight-line length of the wood-cultivated ginseng rhizome as the wood-cultivated ginseng rhizome length by multiplying a number of the counted pixels and the actual length per pixel.

Furthermore, the consumer terminal controller may calculate a curve length of the wood-cultivated ginseng rhizome using the wood-cultivated ginseng image and the start line and end line of the wood-cultivated ginseng rhizome received from the touch screen, and may calculate the wood-cultivated ginseng rhizome based on the calculated curve length of the wood-cultivated ginseng rhizome.

Furthermore, the consumer terminal controller may receive a start line and end line of the wood-cultivated ginseng rhizome adjusted by the user, may search for a red outline pattern using a pattern recognition technology, may analyze an actual length per pixel using the retrieved red outline and resolution of the photographing unit, may extract the outlines of the wood-cultivated ginseng from the wood-cultivated ginseng image, may search the extracted outlines of the wood-cultivated ginseng for the upper outline and lower outline of the wood-cultivated ginseng between the start line of the wood-cultivated ginseng rhizome and the end line of the wood-cultivated ginseng rhizome, may eliminate image noise from the upper outline and lower outline of the wood-cultivated ginseng, and may calculate the average of the length of upper curve of the wood-cultivated ginseng rhizome and the length of lower curve of the wood-cultivated ginseng rhizome as the wood-cultivated ginseng rhizome length by multiplying the number of pixels of each of the upper curve of the wood-cultivated ginseng rhizome and the lower curve of the wood-cultivated ginseng rhizome and the actual length per pixel.

Furthermore, the server may include a wood-cultivated ginseng age information database configured to store wood-cultivated ginseng age information corresponding to a wood-cultivated ginseng rhizome length; a server communication unit configured to communicate with the consumer terminal; and a server controller configured to receive the wood-cultivated ginseng rhizome length from the consumer terminal, search the wood-cultivated ginseng age information database for age information corresponding to the wood-cultivated ginseng rhizome length received from the consumer terminal, and control the server communication unit to transmit the retrieved age information to the consumer terminal.

In this case, the wood-cultivated ginseng age information stored in the age information database and corresponding to the wood-cultivated ginseng rhizome length may be based on national statistics or local statistics. The server controller may search for wood-cultivated ginseng age information based on the local statistics when area information is received.

Furthermore, the system further includes a producer terminal configured to QR code of a wood-cultivated ginseng and a front image and rear image of the wood-cultivated ginseng. The server controller may extract the front feature element and rear feature element of the wood-cultivated ginseng from the front image and rear image of the wood-cultivated ginseng received from the producer terminal, respectively, may store the front feature element and rear feature element of the wood-cultivated ginseng in the age information database by matching the front feature element and rear feature element to the QR code received from the producer terminal, may extract the feature element of the wood-cultivated ginseng from the wood-cultivated ginseng image received from the consumer terminal when the consumer terminal transmits the QR code and the wood-cultivated ginseng image including the QR code, and may search the age information database for the front feature element and rear feature element of the wood-cultivated ginseng corresponding to the feature element of the wood-cultivated ginseng and transmits the retrieved front feature element and rear feature element to the consumer terminal.

Advantageous Effects

In accordance with the system for providing wood-cultivated ginseng age information according to an embodiment of the present invention, consumer reliability can be improved because wood-cultivated ginseng age information is provided to a wood-cultivated ginseng consumer so that the wood-cultivated ginseng consumer can be easily aware of the wood-cultivated ginseng age.

Furthermore, a wood-cultivated ginseng consumer can identify whether a wood-cultivated ginseng purchased through wood-cultivated ginseng e-commerce is genuine because the consumer can identify whether the purchased wood-cultivated ginseng is a wood-cultivated ginseng provided by a wood-cultivated ginseng producer.

Effects of the present invention are not limited to the aforementioned objects, and other effects not described above may be evidently understood by those skilled in the art to which the present invention pertains from the following description.

DESCRIPTION OF DRAWINGS

FIG. 1 is a block diagram schematically showing a system for providing wood-cultivated ginseng age information according to an embodiment of the present invention.

FIG. 2 is a diagram showing the background sheet of the system for providing wood-cultivated ginseng age information according to an embodiment of the present invention.

FIG. 3 is a diagram showing the state in which the background sheet of the system for providing wood-cultivated ginseng age information according to an embodiment of the present invention attached or printed on a wood-cultivated ginseng storage box.

FIG. 4 is a block diagram showing the consumer terminal of the system for providing wood-cultivated ginseng age information according to an embodiment of the present invention.

FIG. 5 is a block diagram showing the server of the system for providing wood-cultivated ginseng age information according to an embodiment of the present invention.

FIG. 6 is a diagram showing a viewfinder image of the system for providing wood-cultivated ginseng age information according to an embodiment of the present invention.

FIG. 7 is a diagram showing a wood-cultivated ginseng image captured by the photographing unit of the system for providing wood-cultivated ginseng age information according to an embodiment of the present invention.

FIGS. 8 and 9 are diagrams for illustrating a process for the system for providing wood-cultivated ginseng age information according to an embodiment of the present invention to calculate a wood-cultivated ginseng rhizome length.

MODE FOR INVENTION

Hereinafter, embodiments of the present invention are described in detail with reference to the accompanying drawings. The merits and characteristics of the present disclosure and a method for achieving the merits and characteristics will become more apparent from the embodiments described in detail in conjunction with the accompanying drawings. However, the present disclosure is not limited to the disclosed embodiments, but may be implemented in various different ways. The embodiments are provided to only complete the present disclosure and to allow those skilled in the art to fully understand the category of the present disclosure. The present disclosure is defined by the category of the claims. The same reference numerals will be used to refer to the same or similar elements throughout the specification.

All of terms (including technological and scientific terms) used in the specification, unless defined otherwise, will be used as meanings which can be understood by a person having ordinary skill in the art to which the present invention pertains in common.

Furthermore, terms that are commonly used and defined in dictionaries should not be construed as having ideal or excessively formal meanings unless defined otherwise.

Terms used in the specification are provided to describe the embodiments and are not intended to limit the present invention. In the specification, the singular form, unless specially described otherwise, may include the plural form. Furthermore, a term, such as "comprise (or include)" and/or "comprising (or including)" used in the specification, do not exclude the existence or addition of one or more elements in addition to the described elements.

Hereinafter, a system for providing wood-cultivated ginseng age information according to an embodiment of the present invention is described with reference to the accompanying drawings.

Referring to FIGS. 1 to 9, the system for providing wood-cultivated ginseng age information (hereinafter referred to as the "wood-cultivated ginseng age information provision system") 1 according to an embodiment of the present invention may include a background sheet 10 made of paper or plastic (refer to FIG. 2) or a background sheet 10 (refer to FIG. 3) attached or printed on a wood-cultivated ginseng storage box B, a consumer terminal 100 configured to obtain a wood-cultivated ginseng image WGI (refer to FIG. 7) of the wood-cultivated ginseng placed on the background sheet 10 by a user, receive the start line SL (refer to FIG. 7) of the wood-cultivated ginseng rhizome H and the end line TL (refer to FIG. 7) of the wood-cultivated ginseng rhizome H by the user, calculate a wood-cultivated ginseng rhizome length HL (refer to FIG. 9(*b*)) using the obtained wood-cultivated ginseng image WGI, the start line SL of the wood-cultivated ginseng rhizome H and the end line TL of the wood-cultivated ginseng rhizome H, and transmit the calculated wood-cultivated ginseng rhizome length HL, and a server 200 configured to previously store wood-cultivated ginseng age information corresponding to a wood-cultivated ginseng rhizome length HL, search for wood-cultivated ginseng age information corresponding to the wood-cultivated ginseng rhizome length HL received from the consumer terminal 100, and transmit the retrieved wood-cultivated ginseng age information to the consumer terminal 100.

The wood-cultivated ginseng age information provision system 1 may further include a communication network 20 configured to communicatively connect the consumer terminal 100 and the server 200. In this case, the communication network 20 may be implemented using a wired communication network or a wireless communication network and may be implemented through the Internet.

The background sheet 10 may be provided in a box in which wood-cultivated ginseng has been packaged or may be attached or printed on the box in order for a wood-cultivated ginseng producer to deliver the wood-cultivated ginseng to a wood-cultivated ginseng consumer when wood-cultivated ginseng transaction (including e-commerce) is performed between the wood-cultivated ginseng producer and the wood-cultivated ginseng consumer.

The background sheet 10 may have been provided from the operator of the wood-cultivated ginseng age information provision system to the wood-cultivated ginseng producer at a cost or free of charge. As shown in FIGS. 2 and 3, reference markers 11 may be printed on the four corner parts of the background sheet 10. A wood-cultivated ginseng figure may be printed on the background sheet 10 for convenience of the user.

The background sheet 10 may be attached or printed on the back of the cover B-1 of the open wood-cultivated ginseng storage box B, as shown in FIG. 3.

A ruler 12 may be printed on the middle part of the background sheet 10, as shown in FIGS. 2 and 3. Accordingly, when a user photographs wood-cultivated ginseng using the consumer terminal 100, the user may have a feeling as if the user measures the length of a wood-cultivated ginseng rhizome.

The wood-cultivated ginseng storage box B may be a box in which wood-cultivated ginseng has been packaged in order for a wood-cultivated ginseng producer to deliver the wood-cultivated ginseng to a wood-cultivated ginseng consumer when wood-cultivated ginseng transaction (including e-commerce) is performed between the wood-cultivated ginseng producer and the wood-cultivated ginseng consumer.

In an embodiment of the present invention, the wood-cultivated ginseng storage box B and the background sheet 10 have been illustrated as being separately fabricated and attached, but the present invention is not limited thereto. The background sheet 10 may be implemented by printing the contents of the background sheet 10 on the wood-cultivated ginseng storage box B.

The consumer terminal 100 may include a photographing unit 120 configured to photograph wood-cultivated ginseng WG positioned on the background sheet 10, a display unit 130 configured to display a viewfinder image VF (refer to FIG. 6) of the photographing unit 120 or a wood-cultivated ginseng image WGI, a touch screen 140 coupled to the display unit 130 to enable a user to input the start line SL and end line TL of the wood-cultivated ginseng rhizome H, a consumer terminal communication unit 150 configured to communicate with the server 200, and a consumer terminal controller 110 configured to store the wood-cultivated ginseng image WGI captured by the photographing unit 120, control the display unit 130 to display the viewfinder image VF when the photographing unit 120 captures an image, receive the start line SL of the wood-cultivated ginseng rhizome H and the end line TL of the wood-cultivated ginseng rhizome H from the touch screen 140 in response to a user's touch when the wood-cultivated ginseng image WGI is displayed on the display unit 130, calculate the wood-cultivated ginseng rhizome length HL, and control the consumer terminal communication unit 150 to transmit the calculated wood-cultivated ginseng rhizome length HL.

The photographing unit 120 may be implemented using a known digital camera mounted on a smart device, such as a smartphone or a smart pad.

The display unit 130 may be implemented using a known display device, such as an LCD panel, an OLED panel or a PDP panel.

The reference markers 11 are indicated at the four corner parts of the background sheet 10. Guidance markers G corresponding to the reference markers 11 may be indicated at the four corner parts of the viewfinder image VF displayed on the display unit 130, as shown in FIG. 6. In this case, a user may match the reference markers 11 printed on the background sheet 10 to the guidance markers G indicated in the viewfinder image VF so that the photographing unit 120 obtains a wood-cultivated ginseng image. Accordingly, there is no error in a wood-cultivated ginseng rhizome length calculated by the consumer terminal controller 110.

The consumer terminal controller 110 may calculate the straight line length HL of the wood-cultivated ginseng rhizome H as the wood-cultivated ginseng rhizome length HL using the wood-cultivated ginseng image WGI and the start line SL of the wood-cultivated ginseng rhizome H and the end line TL of the wood-cultivated ginseng rhizome H received from the touch screen 140, and may transmit the calculated wood-cultivated ginseng rhizome length HL to the server 200.

That is, the start line and end line of the wood-cultivated ginseng rhizome are displayed on the display unit. A user may adjust the start line and the end line. As shown in FIG. 8, the consumer terminal controller 110 receives the start line SL of the wood-cultivated ginseng rhizome H and the end line TL of the wood-cultivated ginseng rhizome H adjusted by a user. In the present embodiment, the start line SL and the end line TL have been illustrated as being positioned on the right side and left side, respectively, but the scope of the present invention is not limited thereto. The locations of the start line SL and the end line TL may be reversed.

Thereafter, the consumer terminal controller 110 searches for a red outline such as that shown in FIG. 8, that is, the pattern of the reference markers 11, or searches for a red outline such as that shown in FIGS. 6 and 8, that is, the pattern of the guidance markers G, using a pattern recognition technology.

Thereafter, the consumer terminal controller 110 analyzes an actual length per pixel using the retrieved red outline and resolution of the photographing unit 120.

Thereafter, the consumer terminal controller 110 counts pixels positioned in a straight line between the start line SL of the wood-cultivated ginseng rhizome H and the end line TL of the wood-cultivated ginseng rhizome H.

Thereafter, the consumer terminal controller 110 calculates the straight line length HL of the wood-cultivated ginseng rhizome H as the wood-cultivated ginseng rhizome length HL by multiplying the number of pixels and an actual length corresponding to one pixel.

Thereafter, the consumer terminal controller 110 transmits the wood-cultivated ginseng rhizome length HL, calculated by the consumer terminal communication unit 150, to the server 200.

If the rhizome of a wood-cultivated ginseng is bent, a wood-cultivated ginseng rhizome length HL may be calculated using the curve length of a wood-cultivated ginseng rhizome H in order to measure the wood-cultivated ginseng rhizome length HL more precisely.

That is, the consumer terminal controller 110 may calculate the curve length of the wood-cultivated ginseng rhizome H using the wood-cultivated ginseng image WGI and the start line SL of the wood-cultivated ginseng rhizome H and the end line TL of the wood-cultivated ginseng rhizome H received from the touch screen 140, may calculate the wood-cultivated ginseng rhizome length HL using the calculated curve length of the wood-cultivated ginseng rhizome H, and may transmit the calculated wood-cultivated ginseng rhizome length HL to the server 200.

Specifically, the consumer terminal controller 110 receives the start line SL of the wood-cultivated ginseng rhizome H and the end line TL of the wood-cultivated ginseng rhizome H adjusted by a user, as shown in FIG. 9(a).

Thereafter, the consumer terminal controller 110 searches for a red outline such as that shown in FIG. 6 and FIG. 9(a), that is, the pattern of the guidance markers G or the pattern of the reference markers 11, using a pattern recognition technology.

Thereafter, the consumer terminal controller 110 analyzes an actual length per pixel using the retrieved red outline and resolution of the photographing unit 120.

Thereafter, the consumer terminal controller 110 extracts the outline CL of the wood-cultivated ginseng WG from the wood-cultivated ginseng image WGI, as shown in FIG. 9(b). In this case, the outline CL of the wood-cultivated ginseng WG may be extracted using an edge extraction method.

Thereafter, the consumer terminal controller 110 searches for rhizome parts of the outline CL of the wood-cultivated ginseng WG, that is, the upper outline UCL of the wood-cultivated ginseng WG and the lower outline DCL of the wood-cultivated ginseng WG between the start line SL of the wood-cultivated ginseng rhizome H and the end line TL of the wood-cultivated ginseng rhizome H. In this case, the upper outline UCL of the wood-cultivated ginseng WG and the lower outline DCL of the wood-cultivated ginseng WG may be extracted using an active contour tracking method.

Thereafter, the consumer terminal controller 110 eliminates image noise from the upper outline UCL of the wood-cultivated ginseng WG and the lower outline DCL of the wood-cultivated ginseng WG using a low pass filter. Accordingly, small lines are removed from the upper outline UCL of the wood-cultivated ginseng WG and the lower outline DCL of the wood-cultivated ginseng WG, thereby making the upper and lower outlines smooth.

Thereafter, the consumer terminal controller 110 calculates the average of the length of upper curve UCL of the wood-cultivated ginseng rhizome H and the length of lower curve DCL of the wood-cultivated ginseng rhizome H as the wood-cultivated ginseng rhizome length HL by multiplying the number of pixels of each of the upper curve UCL of the wood-cultivated ginseng rhizome H and the lower curve DCL of the wood-cultivated ginseng rhizome H and an actual length corresponding to one pixel.

Thereafter, the consumer terminal controller 110 transmits the wood-cultivated ginseng rhizome length HL, calculated by the consumer terminal communication unit 150, to the server 200.

The server 200 may include a wood-cultivated ginseng age information database 230 configured to store wood-cultivated ginseng age information corresponding to a wood-cultivated ginseng rhizome length, a server communication unit 220 configured to communicate with the consumer terminal 100 over the communication network 20, and a server controller 210 configured to receive a wood-cultivated ginseng rhizome length from the consumer terminal 100, search the wood-cultivated ginseng age information database 230 for age information corresponding to the wood-cultivated ginseng rhizome length received from the consumer terminal 100 and to control the server communication unit 220 to transmit the retrieved age information to the consumer terminal 100.

The wood-cultivated ginseng age information that is stored in the age information database 230 and that corresponds to the wood-cultivated ginseng rhizome length may have been based on national statistics. That is, the wood-cultivated ginseng age information corresponding to the wood-cultivated ginseng rhizome length may have been obtained by classifying wood-cultivated ginsengs produced across the country by wood-cultivated ginseng rhizome length, calculating an average age of the classified wood-cultivated ginsengs, and matching the calculated average age to a corresponding wood-cultivated ginseng rhizome length.

The wood-cultivated ginseng age information that is stored in the age information database 230 and that corresponds to the wood-cultivated ginseng rhizome length may have been based on local statistics. That is, the wood-cultivated ginseng age information corresponding to the wood-cultivated ginseng rhizome length may have been obtained by dividing the whole country into areas, classifying wood-cultivated ginsengs produced in the respective areas by wood-cultivated ginseng rhizome length, calculating an average age of the classified wood-cultivated ginsengs, and matching the calculated average age to the wood-cultivated ginseng rhizome length of a corresponding area. In this case, the consumer terminal 100 enables a wood-cultivated ginseng consumer to select the area where the wood-cultivated ginseng is produced. Furthermore, an area mark (e.g., letters, numbers and/or a separate mark) may be printed on the background sheet 10. Accordingly, when the consumer terminal 10 transmits the wood-cultivated ginseng image WGI to the server 200, the server 200 can automatically recognize an area in the wood-cultivated ginseng image WGI.

When the consumer terminal 100 receives wood-cultivated ginseng age information from the server 200, the display unit 130 displays the received wood-cultivated ginseng age information.

In this case, the consumer terminal 100 may transmit the production area of the wood-cultivated ginseng along with the wood-cultivated ginseng rhizome length HL using the user's input or a QR mark.

The wood-cultivated ginseng age information provision system 1 has been illustrated as providing wood-cultivated ginseng age information to a wood-cultivated ginseng consumer using a wood-cultivated ginseng rhizome length, but the present invention is not limited thereto. The wood-cultivated ginseng age information provision system 1 may provide wood-cultivated ginseng age information using the length of a wood-cultivated ginseng body and the length of a wood-cultivated ginseng root.

A wood-cultivated ginseng consumer can easily obtain wood-cultivated ginseng age information using the wood-cultivated ginseng age information provision system 1.

The wood-cultivated ginseng age information provision system 1 may further include a producer terminal 300 configured to enable a producer and the operator of the wood-cultivated ginseng age information provision system 1 to transmit the QR mark of a wood-cultivated ginseng and a front image and rear image of the wood-cultivated ginseng. The wood-cultivated ginseng may be photographed in the state in which it has been placed on the background sheet 10 on which the QR mark has been printed. The QR mark may include information about an area of production (or the country of origin), an area name of production (e.g., a cooperative unit or farming association corporation), whether agricultural pesticides have been detected, various authentication contents, a wood-cultivated ginseng image of each previously photographed package, a distribution, sales, and an appraisal institution.

In this case, the server controller 210 of the server 200 extracts the front feature element and rear feature element of the wood-cultivated ginseng from a front image and rear image of the wood-cultivated ginseng received from the producer terminal 300, respectively, and stores the front feature element and rear feature element of the wood-cultivated ginseng in the age information database 230 by matching them to a QR mark. Furthermore, when the consumer terminal 100 transmits a QR mark and a wood-cultivated ginseng image WGI including the QR mark, the server controller 210 extracts the feature element of the wood-cultivated ginseng from the wood-cultivated ginseng image WGI received from the consumer terminal 100. Furthermore, the server controller 210 searches the age information database 230 for front feature element and rear feature element of the wood-cultivated ginseng identical with the feature element of the wood-cultivated ginseng extracted from the wood-cultivated ginseng image WGI, and transmits the retrieved front feature element and rear feature element to the consumer terminal 100.

In this case, the feature element may include at least one of the contour line of the wood-cultivated ginseng, the connection point of a main root and rootles, the thickness and length of the main root, and the number and length of rootles. Accordingly, a wood-cultivated ginseng consumer can identify whether a wood-cultivated ginseng provided by a wood-cultivated ginseng producer is identical with the wood-cultivated ginseng provided by the wood-cultivated ginseng producer.

Furthermore, the producer terminal 300 may transmit the production traceability of a wood-cultivated ginseng. The age information database 230 of the server 200 may further store the production traceability of a wood-cultivated ginseng.

Although the embodiments of the present invention have been described with reference to the accompanying drawings, those skilled in the art to which the present invention pertains will appreciate that the present invention may be implemented in other detailed forms without departing from the technological spirit or essential characteristics of the present invention. Accordingly, the aforementioned embodiments should be construed as being only illustrative, but should not be construed as being restrictive from all aspects.

INDUSTRIAL APPLICABILITY

The present invention relates to a system for providing wood-cultivated ginseng age information, which enables a wood-cultivated ginseng consumer to be easily aware of a wood-cultivated ginseng age by providing wood-cultivated ginseng age information to the wood-cultivated ginseng consumer, and thus has the industrial applicability.

In accordance with the system for providing wood-cultivated ginseng age information according to an embodiment of the present invention, consumer reliability can be improved because wood-cultivated ginseng age information is provided to a wood-cultivated ginseng consumer so that the wood-cultivated ginseng consumer can be easily aware of the wood-cultivated ginseng age.

Furthermore, a wood-cultivated ginseng consumer can identify whether a wood-cultivated ginseng purchased through wood-cultivated ginseng e-commerce is genuine because the consumer can identify whether the purchased wood-cultivated ginseng is a wood-cultivated ginseng provided by a wood-cultivated ginseng producer.

Effects of the present invention are not limited to the aforementioned objects, and other effects not described above may be evidently understood by those skilled in the art to which the present invention pertains from the following description.

The invention claimed is:

1. A system for providing wood-cultivated ginseng age information, comprising:
    a background sheet made of paper or plastic;
    a consumer terminal configured to obtain a wood-cultivated ginseng image of a wood-cultivated ginseng placed on the background sheet by a user, receive a start line of a wood-cultivated ginseng rhizome and an end line of the wood-cultivated ginseng rhizome by the user, calculate a wood-cultivated ginseng rhizome length using the obtained wood-cultivated ginseng image and the obtained start line and end line of the wood-cultivated ginseng rhizome, and transmit the calculated wood-cultivated ginseng rhizome length; and
    a server configured to previously store wood-cultivated ginseng age information corresponding to a wood-cultivated ginseng rhizome length, search for wood-cultivated ginseng age information corresponding to the wood-cultivated ginseng rhizome length received from the consumer terminal, and transmit the retrieved wood-cultivated ginseng age information to the consumer terminal,
    wherein the consumer terminal comprises:
    a photographing unit configured to photograph the wood-cultivated ginseng positioned on the background sheet;
    a display unit configured to display a viewfinder image of the photographing unit or the wood-cultivated ginseng image;
    a touch screen coupled to the display unit to enable a user to input the start line and end line of the wood-cultivated ginseng rhizome;
    a consumer terminal communication unit configured to communicate with the server; and
    a consumer terminal controller configured to store the wood-cultivated ginseng image captured by the photographing unit, control the display unit to display the viewfinder image when the photographing unit captures an image, receive the start line and end line of the wood-cultivated ginseng rhizome from the touch screen in response to the user's touch when the wood-cultivated ginseng image is displayed on the display unit, calculate the wood-cultivated ginseng rhizome length, and control the consumer terminal communication unit to transmit the calculated wood-cultivated ginseng rhizome length.

2. The system of claim 1, wherein the background sheet is attached or printed on a wood-cultivated ginseng storage box.

3. The system of claim 2, wherein:
    the wood-cultivated ginseng storage box comprises a box in which the wood-cultivated ginseng has been packaged by a wood-cultivated ginseng producer, and
    the background sheet is attached or printed on a back of a cover of the wood-cultivated ginseng storage box.

4. The system of claim 1, wherein:
    reference markers are indicated at four corner parts of the background sheet, and
    guidance markers corresponding to the reference markers are indicated at four corner parts of the viewfinder image.

5. The system of claim 4, wherein the consumer terminal controller calculates a straight-line length of the wood-cultivated ginseng rhizome as the wood-cultivated ginseng rhizome length using the wood-cultivated ginseng image and the start line and end line of the wood-cultivated ginseng rhizome received from the touch screen.

6. The system of claim 5, wherein the consumer terminal controller:
    receives the start line and end line of the wood-cultivated ginseng rhizome,
    searches for a pattern of the guidance markers using a pattern recognition technology, analyzes an actual length per pixel using a retrieved red outline and resolution of the photographing unit,
    counts pixels located in a straight line that connects the start line of the wood-cultivated ginseng rhizome and the end line of the wood-cultivated ginseng rhizome, and
    calculates the straight-line length of the wood-cultivated ginseng rhizome as the wood-cultivated ginseng rhizome length by multiplying a number of the counted pixels and the actual length per pixel.

7. The system of claim 4, wherein the consumer terminal controller calculates a curve length of the wood-cultivated ginseng rhizome using the wood-cultivated ginseng image and the start line and end line of the wood-cultivated ginseng rhizome received from the touch screen, and calculates the wood-cultivated ginseng rhizome based on the calculated curve length of the wood-cultivated ginseng rhizome.

8. The system of claim 7, wherein the consumer terminal controller:
    receives a start line and end line of the wood-cultivated ginseng rhizome adjusted by the user,
    searches for a red outline pattern using a pattern recognition technology,
    analyzes an actual length per pixel using the retrieved red outline and resolution of the photographing unit,
    extracts outlines of the wood-cultivated ginseng from the wood-cultivated ginseng image,
    searches the extracted outlines of the wood-cultivated ginseng for an upper outline and lower outline of the wood-cultivated ginseng between the start line of the wood-cultivated ginseng rhizome and the end line of the wood-cultivated ginseng rhizome, eliminating image noise from the upper outline and lower outline of the wood-cultivated ginseng, and calculating an average of a length of upper curve of the wood-cultivated ginseng rhizome and a length of lower curve of the wood-cultivated ginseng rhizome as the wood-cultivated ginseng rhizome length by multiplying the number of pixels of each of the upper curve of the wood-cultivated ginseng rhizome and the lower curve of the wood-cultivated ginseng rhizome and the actual length per pixel.

9. The system of claim 1, wherein the server comprises:
a wood-cultivated ginseng age information database configured to store wood-cultivated ginseng age information corresponding to a wood-cultivated ginseng rhizome length;
a server communication unit configured to communicate with the consumer terminal; and
a server controller configured to receive the wood-cultivated ginseng rhizome length from the consumer terminal, search the wood-cultivated ginseng age information database for age information corresponding to the wood-cultivated ginseng rhizome length received from the consumer terminal, and control the server communication unit to transmit the retrieved age information to the consumer terminal.

10. The system of claim 9, wherein:
the wood-cultivated ginseng age information stored in the age information database and corresponding to the wood-cultivated ginseng rhizome length is based on national statistics or local statistics, and the server controller searches for wood-cultivated ginseng age information based on the local statistics when area information is received.

11. The system of claim 9, further comprising a producer terminal configured to QR code of a wood-cultivated ginseng and a front image and rear image of the wood-cultivated ginseng, wherein the server controller:
extracts a front feature element and rear feature element of the wood-cultivated ginseng from the front image and rear image of the wood-cultivated ginseng received from the producer terminal, respectively,
stores the front feature element and rear feature element of the wood-cultivated ginseng in the age information database by matching the front feature element and rear feature element to the QR code received from the producer terminal,
extracts a feature element of the wood-cultivated ginseng from the wood-cultivated ginseng image received from the consumer terminal when the consumer terminal transmits the QR code and the wood-cultivated ginseng image comprising the QR code, and
searches the age information database for the front feature element and rear feature element of the wood-cultivated ginseng corresponding to the feature element of the wood-cultivated ginseng and transmits the retrieved front feature element and rear feature element to the consumer terminal.

* * * * *